(12) United States Patent
Uyehara (10) Patent No.: US 8,783,546 B2
(45) Date of Patent: Jul. 22, 2014

(54) REUSABLE GIFT WRAP WITH INTEGRATED BOW

(76) Inventor: Stacy Uyehara, Honolulu, HI (US)

( * ) Notice: Subject to any disclaimer, the term of this patent is extended or adjusted under 35 U.S.C. 154(b) by 396 days.

(21) Appl. No.: 12/277,208

(22) Filed: Nov. 24, 2008

(65) Prior Publication Data
US 2010/0127052 A1    May 27, 2010

(51) Int. Cl.
*A45C 3/00* (2006.01)
*B65D 65/00* (2006.01)
*B65D 75/00* (2006.01)
*B65D 65/38* (2006.01)
*B65D 85/00* (2006.01)
*B65D 65/02* (2006.01)
*B65D 30/00* (2006.01)

(52) U.S. Cl.
USPC ......... 229/87.19; 229/87.18; 229/89; 229/90; 229/91; 229/87.01; 150/154; 383/4

(58) Field of Classification Search
CPC ..... B65D 23/0842; A45C 7/0095; A45C 3/00
USPC .................... 229/87.19, 87.01, 87.18, 89–91; 150/154; 383/4
See application file for complete search history.

(56) References Cited

U.S. PATENT DOCUMENTS

| | | | |
|---|---|---|---|
| 222,614 A | | 12/1879 | Weaver |
| 1,385,695 A | * | 7/1921 | MacCormack et al. ........ 383/92 |
| 1,474,826 A | | 10/1922 | Hudec |
| 2,143,308 A | | 1/1939 | Flach |
| 2,734,543 A | * | 2/1956 | Hunter ........................... 206/439 |
| 2,792,167 A | * | 5/1957 | Sparks ........................ 229/103.3 |
| 3,683,987 A | | 8/1972 | Robertson |
| 3,756,499 A | * | 9/1973 | Giebel et al. ............. 229/117.17 |
| 4,562,952 A | * | 1/1986 | Chinman .................... 229/87.15 |
| 4,881,684 A | | 11/1989 | Chinman |
| 4,917,291 A | * | 4/1990 | Saiki et al. ..................... 229/155 |
| 5,004,144 A | * | 4/1991 | Selga ........................... 229/87.19 |
| 5,232,258 A | * | 8/1993 | Rossi ............................. 294/152 |
| 5,236,121 A | | 8/1993 | Wollman et al. |
| 5,392,983 A | | 2/1995 | Clarke-Bolling et al. |
| 5,407,125 A | | 4/1995 | Yates et al. |
| 5,518,313 A | | 5/1996 | McAdam |

(Continued)

FOREIGN PATENT DOCUMENTS

| | | | | |
|---|---|---|---|---|
| DE | 29610586 U1 | * | 10/1997 | ............. B65D 30/10 |
| JP | 09077123 | * | 3/1997 | ............. B65D 65/02 |
| JP | 10147364 | | 6/1998 | |

OTHER PUBLICATIONS

International Search Report and Written Opinion for PCT/US09/0065406 dated Jan. 21, 2010 (6 pages).

(Continued)

*Primary Examiner* — Jes F Pascua
*Assistant Examiner* — Derek Battisti
(74) *Attorney, Agent, or Firm* — Innovation Counsel LLP (57) ABSTRACT

A reusable flexible sheet for wrapping an object is presented. The flexible sheet includes a center portion having a first side, a second side, a third side, and a fourth side, the first side being parallel to the third side and the second side being parallel to the fourth side. Flaps are connected to the first side and the third side, and bow portions are connected to the second side and the fourth side. The bow portions tie together to form a decorative bow.

17 Claims, 8 Drawing Sheets

(56) References Cited

U.S. PATENT DOCUMENTS

| | | | | |
|---|---|---|---|---|
| 5,781,946 | A | * | 7/1998 | McEntire et al. ............... 5/482 |
| D410,196 | S | * | 5/1999 | Berg ............................ D9/432 |
| 5,934,548 | A | * | 8/1999 | Kenyon ..................... 229/87.19 |
| 5,971,264 | A | | 10/1999 | Karahoca |
| 5,979,744 | A | * | 11/1999 | Brigleb ..................... 229/87.01 |
| 6,009,576 | A | | 1/2000 | Gramme et al. |
| D464,261 | S | * | 10/2002 | Hereth ......................... D9/422 |
| 6,457,635 | B1 | | 10/2002 | Scicluna |
| 7,036,257 | B1 | | 5/2006 | Sardo |
| 7,077,308 | B2 | | 7/2006 | Beach |
| 2002/0179698 | A1 | | 12/2002 | Temkin |
| 2007/0041670 | A1 | | 2/2007 | Spizman et al. |
| 2007/0056870 | A1 | | 3/2007 | Mihallo |
| 2007/0164090 | A1 | | 7/2007 | Solomonson |

OTHER PUBLICATIONS

Joe Yonan, The Washington Post, "Put an old twist on gift wrap", The Seattle Times, Saturday, Dec. 15, 2007, http://seattletimes.nwsource.com, 2 pages.

http://www.esty.com; Esty :: lovestitches :: Reusable fabric wrapping paper, Feb. 12, 2008, 2 pages.

* cited by examiner

REUSABLE GIFT WRAP WITH INTEGRATED BOW

BACKGROUND

This invention relates to a reusable article for gift wrapping.

The concept of gift exchange has been around for a long time in many different places around the world. Typically, a gift is covered in some form at the time of the exchange, and the covering usually makes the package appealing and attractive. The way gift wrapping has evolved today, it often involves a disposable paper product with a design that is attractive or indicative of the occasion (e.g., wrapping paper). In addition, there are usually ribbons and bows to further decorate the covered gift.

One of the problems with the modern-day gift wrapping practice is that it is inconvenient. First, one has to have all the right tools to even tackle gift wrapping: typically wrapping paper, bows and/or ribbons, tape, and scissors. One has to constantly replenish the wrapping material supply as it gets used, adding to the list of items one has to remember to buy. Second, purchasing the gift wrapping material is not as simple as purchasing milk or toilet paper. The decorative bows and ribbons have to complement the wrapping papers in terms of size, color, and occasion. Third, the wrapping and the decorating of the gift require a certain amount of skill and artistic talent to make the end product beautiful. Furthermore, depending on the shape of the object to be wrapped, creativity of varying degrees is required. If you don't have the time or the skill, gift wrapping can be a source of frustration. An alternative is to have the gift professionally wrapped, but that comes at an extra price.

Another problem with the modern-day gift wrapping practice is that it is wasteful. Wrapping paper, which often have beautiful and elaborate printed materials on it, is purchased with good money only to be ripped and thrown out by the gift recipient. Even if the wrapping paper were carefully opened without ripping, the fold lines and wrinkles would prevent the wrapping paper from being reused. The bows and ribbons may be reusable in theory, but they hardly ever get reused in practice because they have to be of the right length, thickness, and color to be used again.

Yet another problem with the modern-day gift wrapping is that it is not environmentally friendly. According to some studies, the current rate of paper consumption, especially during the holidays, is unsustainable. In addition to depleting the world's forests, the wrapping paper and decorative material all contribute to increased garbage production. After ending up in a garbage bin, the wrapping paper has to be processed (e.g., burned), contributing to environmental pollution. While people are becoming increasingly aware of the need to conserve natural resources such as trees, modern-day gift wrapping conflicts with this trend.

More publications today are advocating reduction of paper usage, for example by skipping the use of wrapping paper altogether during holiday season. Given the above problems with modern-day gift wrapping practice, a way of wrapping gifts that requires less time and skill, is less wasteful, and more environmentally conscious is desirable.

SUMMARY

In one aspect, the invention is a flexible sheet for wrapping an object. The flexible sheet includes a center portion having a first side, a second side, a third side, and a fourth side, the first side being parallel to the third side and the second side being parallel to the fourth side. Flaps are connected to the first side and the third side, and bow portions are connected to the second side and the fourth side. The bow portions tie together to form a decorative bow. The flexible sheet is reusable.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

In the following description, reference is made to the accompanying drawings which illustrate several embodiments of the present invention. It is understood that other embodiments may be utilized without departing from the spirit and scope of the present disclosure. For example, although the specific examples are described as being made of fabric, any reusable and flexible material may be used to make the invention. Similarly, although parts of the fabric are described as being "tied" together, it will be apparent to a person of ordinary skill in the art that alternative fastening means may be used. The following detailed description is not to be taken in a limiting sense, and the scope of the embodiments of the present invention is defined only by the claims of the issued patent.

It will be understood that, although the terms first, second, third etc. may be used herein to describe various elements and/or sections, these elements and/or sections should not be limited by these terms. These terms are only used to distinguish one element or section from another. Thus, a first element discussed below could be termed a second element without departing from the teachings of the present invention.

Figure 1:
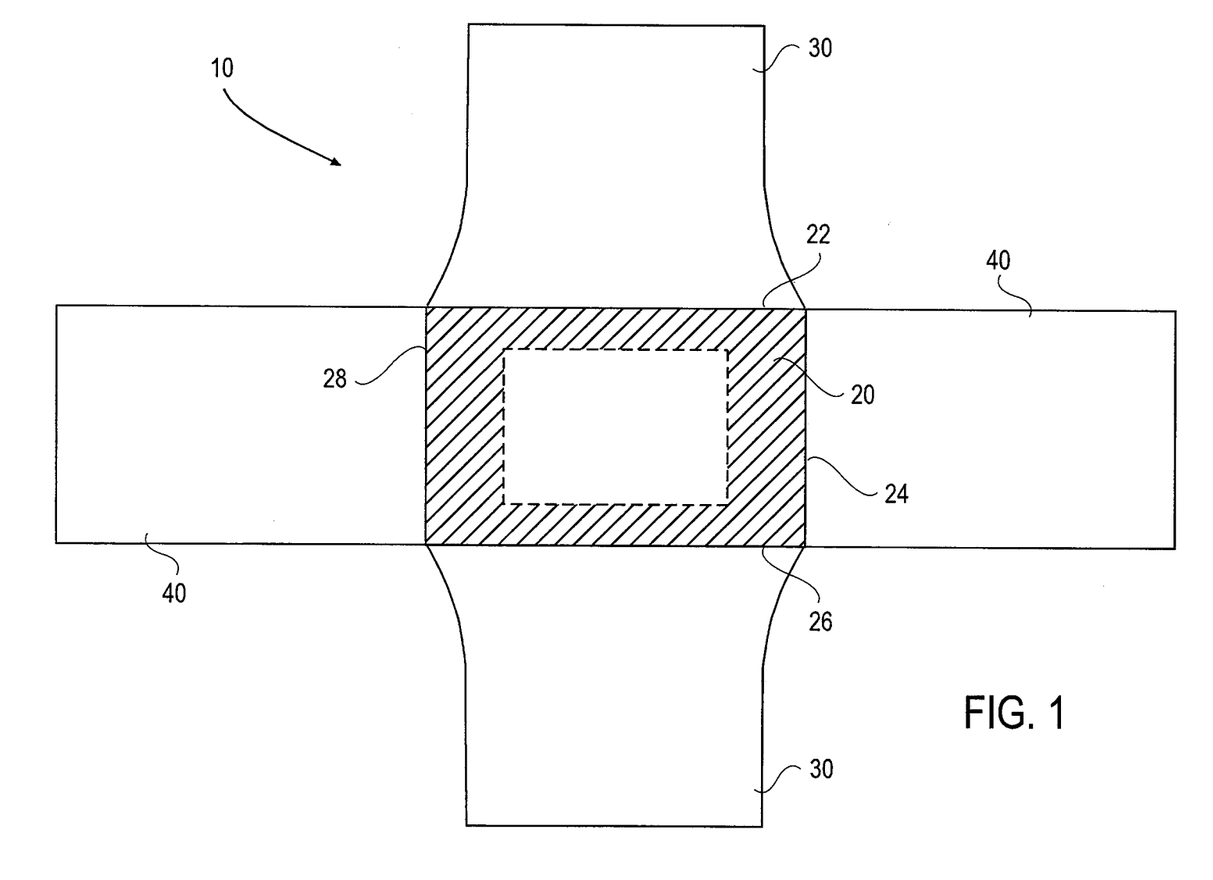
FIG. 1 is an exemplary embodiment of the flexible wrapping sheet of the invention.

FIG. 1 shows a wrapping sheet 10 of the invention. The wrapping sheet 10 has a central portion 20 that has a first side 22, a second side 24, a third side 26, and a fourth side 28. Flaps 30 are connected to the first side 22 and the third side 26, and bow portions 40 are connected to the second side 24 and the fourth side 28. An object (e.g., a gift) may be placed on the center portion 20 as shown by the broken lines. To wrap the object, the flaps 30 are first brought together over the object. In some cases, the flaps 30 are tied together over the object—one or two simple overhand knots may be used to tie the flaps 30 together. Then, the bow portions 40 are brought together to further envelope the object and to form a decorative bow. As shown, the bow portions 40 are integrated with the rest of the wrapping sheet 10. For the wrapped end product to look appealing, it is preferable that the bow portions 40 have a design or pattern that is different from the rest of the wrapping sheet 10. For example, the center portion 20 and the flaps 30 may have a floral pattern while the bow portions 40 may be of a complementing or contrasting solid color.

Figure 2:
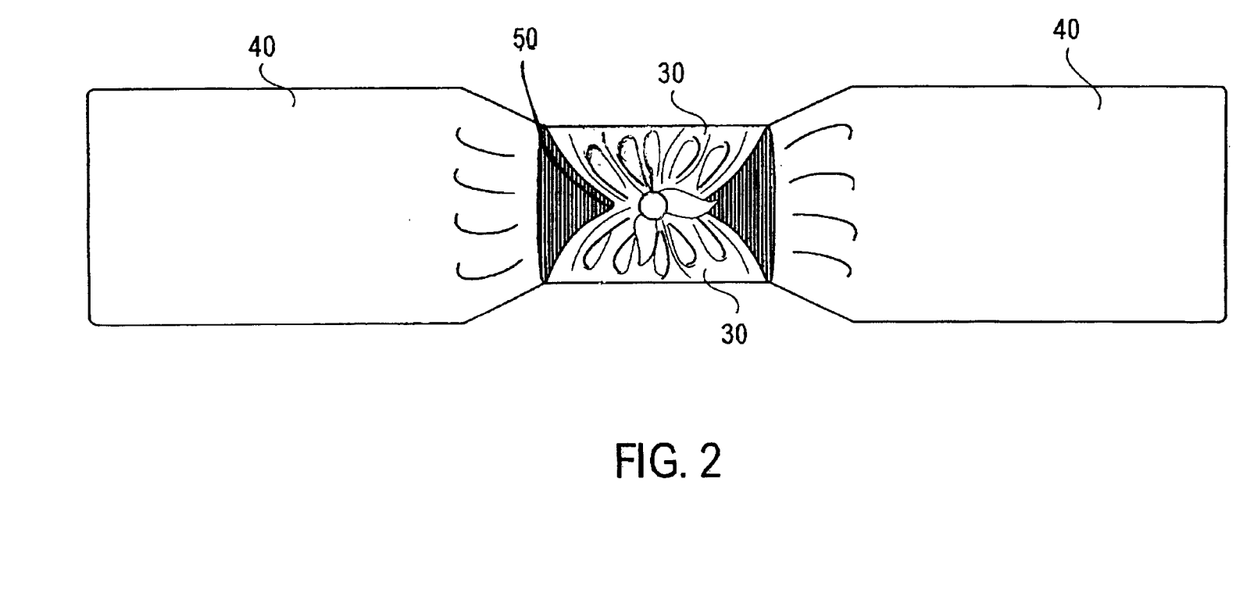
FIG. 2 shows a gift that is partially wrapped using the wrapping sheet of the invention.
Figure 3:
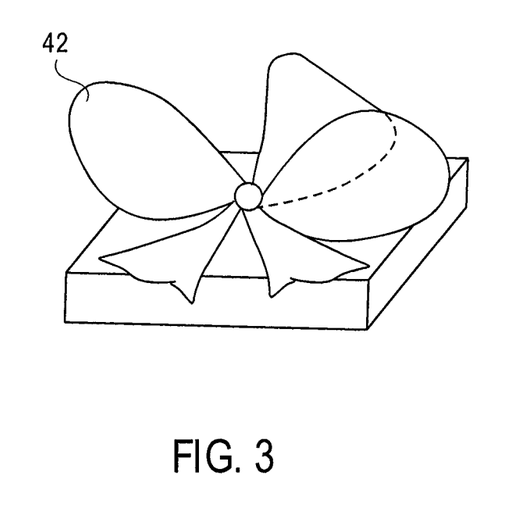
FIG. 3 shows a gift that is completely wrapped using the wrapping sheet of the invention.

FIG. 2 shows an object 50 in a partly-wrapped state using the wrapping sheet 10 of FIG. 1, whereby the flaps 30 are tied together but not the bow portions 40. In the particular case, the object 50 is not completely covered in this partly-wrapped state. FIG. 3 shows a final wrapped product prominently displaying the bow 42 formed by tying the bow portions 40 together. The object 50 is completely covered in the final wrapped product. The bow portions 40 function as the wrapping material that covers the portions of the object 50 that are not covered by the flaps 30 and at the same time serve a decorative purpose. The bow portions 40 are not limited to being tied a certain way, and the user is free to use his/her creativity and skills to use the bow portions 40 in a decorative manner.

Figure 4:
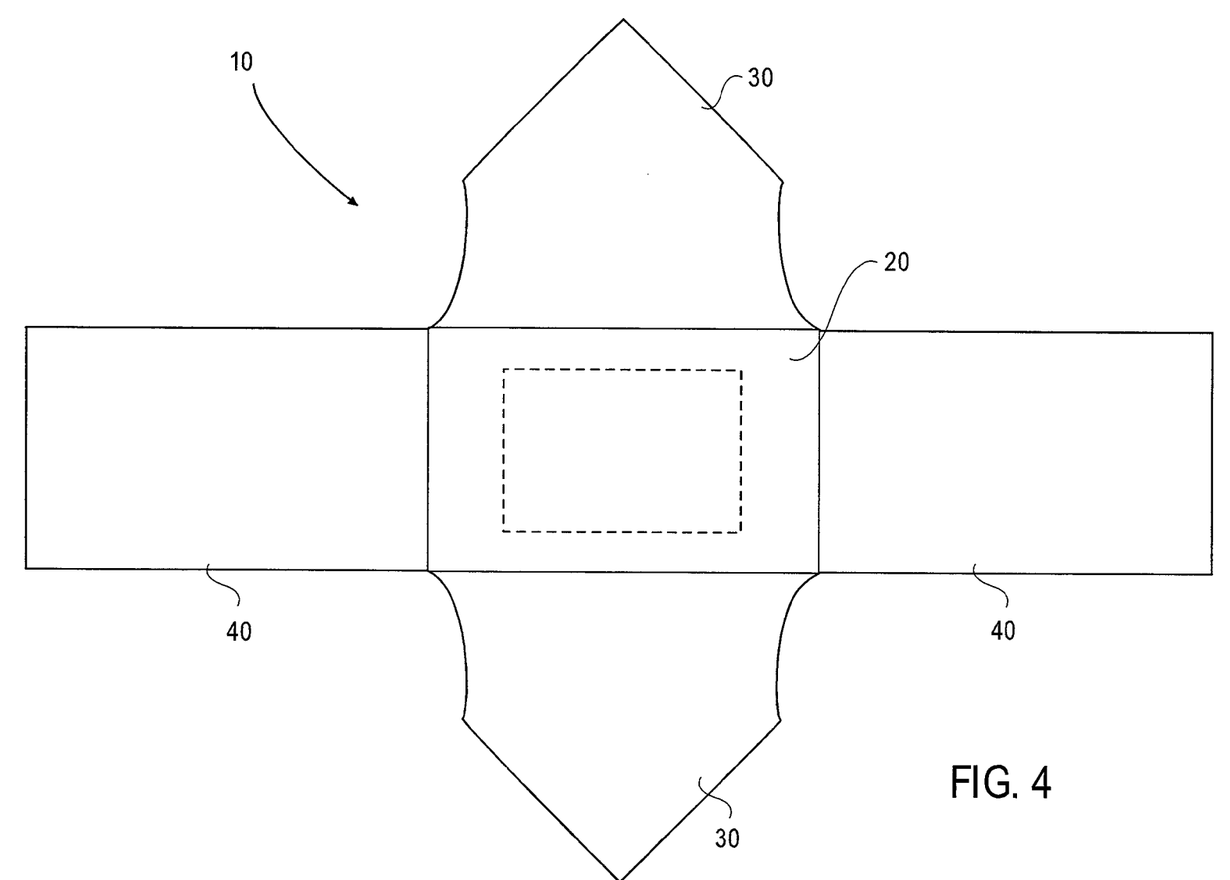
FIGS. 4, 5, 6A, and 6B are alternative embodiments of the flexible wrapping sheet of the invention.
Figure 7:
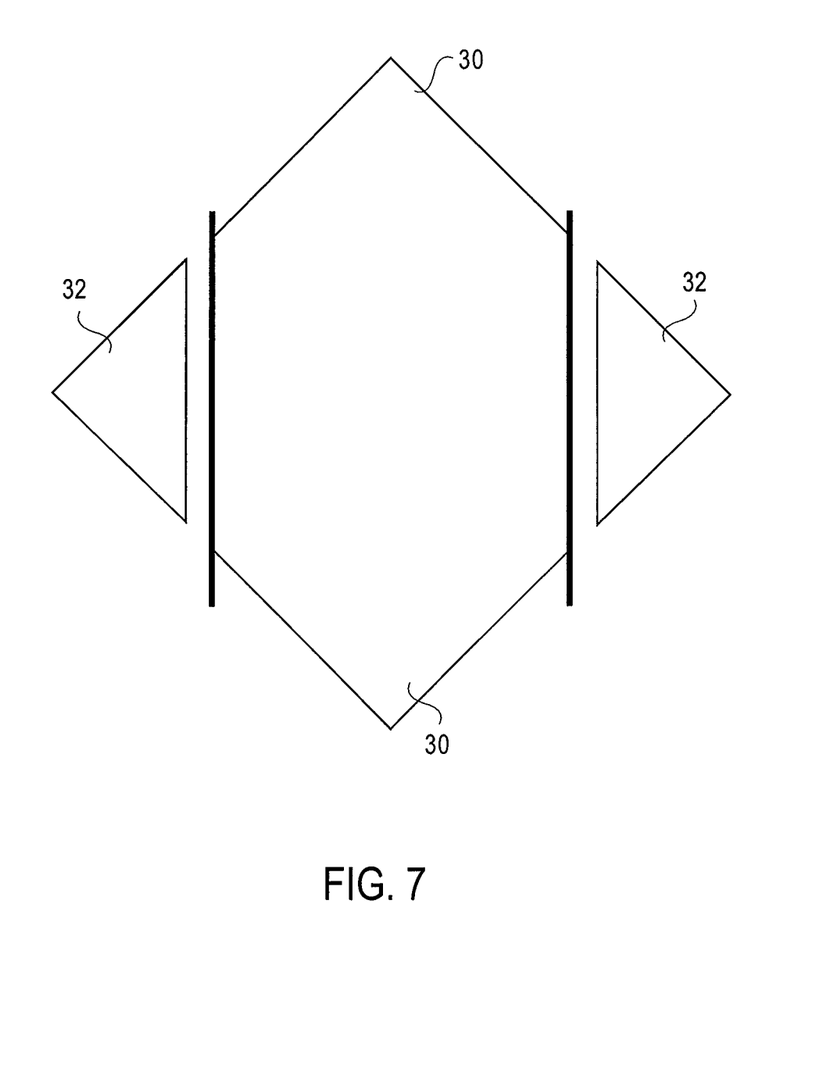
FIG. 7 demonstrates how a square sheet is cut to produce the wrapping sheet of the invention.

FIG. 4 is an alternative embodiment of the wrapping sheet 10. The wrapping sheet 10 of this embodiment is similar to the wrapping sheet of FIG. 1, with one of the differences being the shapes of the flaps 30. The flaps 30 in this embodiment are triangularly-shaped to facilitate their being tied together and reduce the amount of fabric that is required. The distinctive shape of the wrapping sheet of this embodiment has a number of benefits. For example, it requires less fabric compared to a simple square sheet that would be used to wrap a gift of the same size. Furthermore, by getting rid of two corner portions 32 that would not be used for tying a knot (as shown in FIG. 7), the portions that could result in undesirable "bulges" are eliminated to facilitate the tying of a knot. Moreover, the distinct shape of the sheet helps "guide" the box into position. If the ends were plain 90° angles (squares rather than triangles), the knot could end up in a number of different positions and the box would stay wherever the knot was tied. By having the tips of triangles come together, the box becomes centered.

Figure 5:
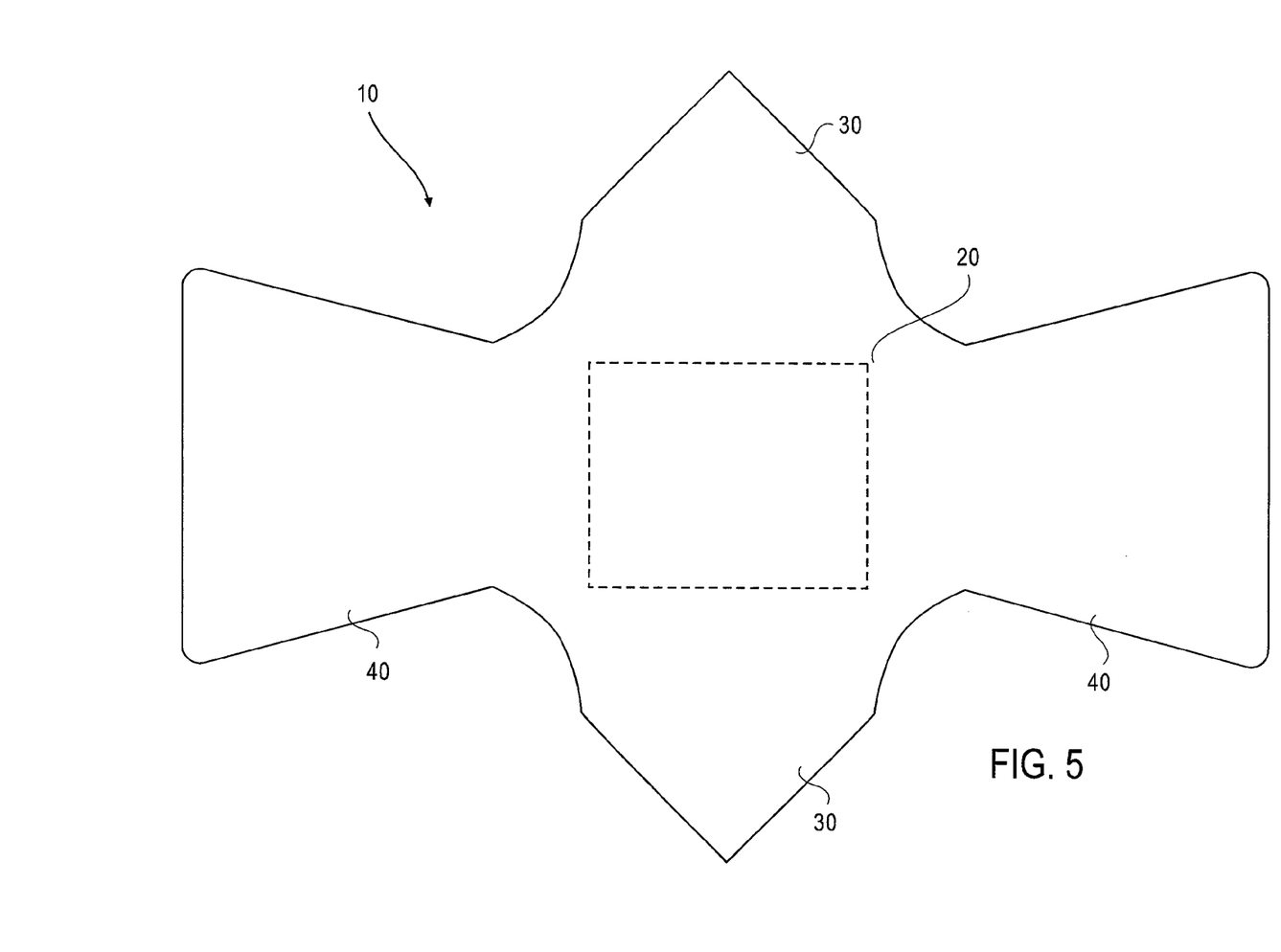

FIG. 5 is yet another embodiment of the wrapping sheet 10. This embodiment of the wrapping sheet 10 is generally similar to the embodiment shown in FIG. 4, except that the shape of the bow portions 40 and the dimensions of the central portion 20, the flaps 30, and the bow portions 40 are different. FIG. 5 shows that the dimensions of these parts can be changed to wrap different-sized and differently-shaped objects. As the flaps 30 serve the function of covering the object to be wrapped, they are made long enough to wrap around the object that is placed on the center portion 20. Similarly, the bow portions 40 are made long enough to cover parts of the object being wrapped and tie together in a decorative manner. In this embodiment, the outer end of the bow portions 40 are cut to be wider than the end that meets the center portion 20. The widening of the bow portions 40 makes the bow "plume" into a flower-like shape when tied together, making the end result more attractive than a gift with a plain, nondescript bow.

The wrapping sheet 10 may be made in different sizes and different dimensions, so that users can select a sheet of desired size and shape. Due to the fact that the flaps 30 and the bow portions 40 are generously sized, each sheet can be used to wrap a wide range of objects.

Figure 6A:
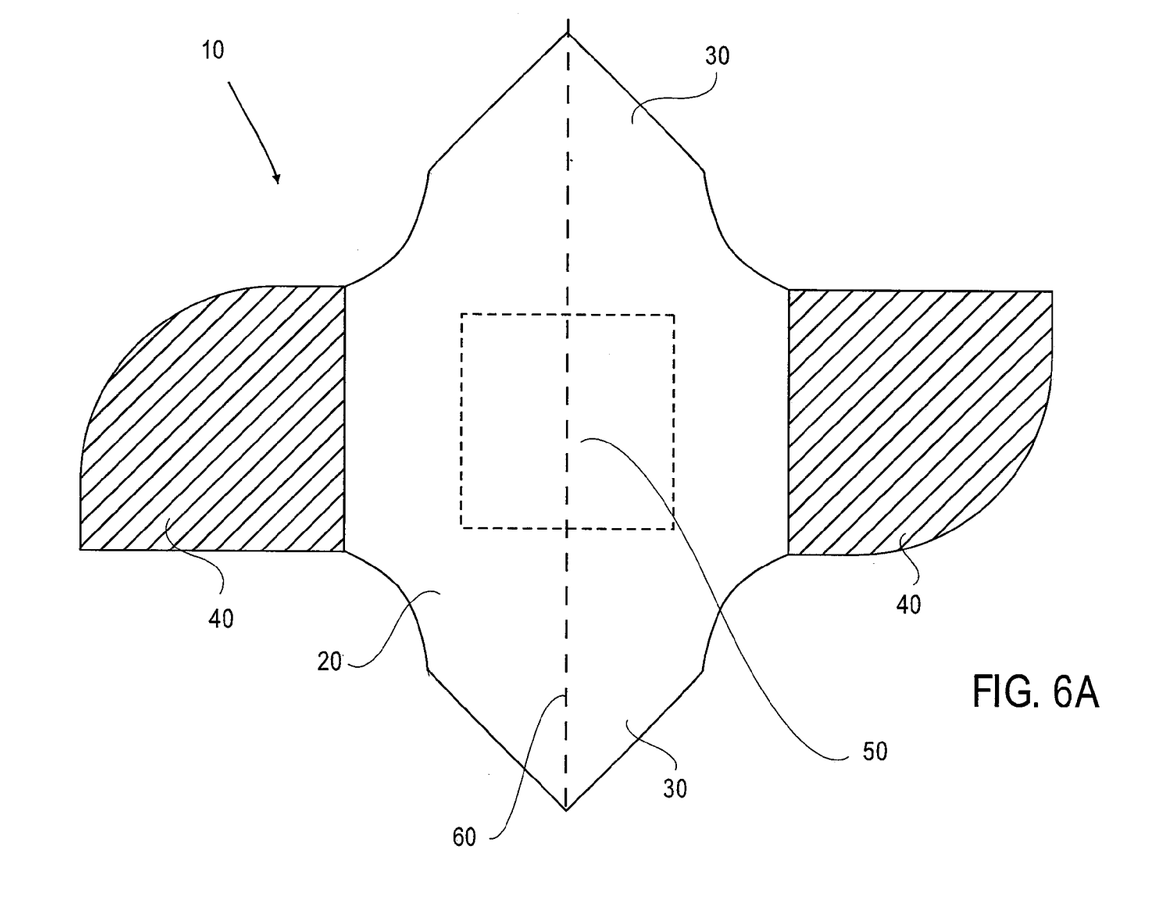

FIG. 6A is yet another embodiment of the wrapping sheet 10. This embodiment is generally similar to the embodiment of FIG. 5, with one of the differences being the shapes of the bow portions 40. Each of the bow portions has a rounded end. More specifically, in this example, each of the bow portions has a quarter-circle shape, and the two bow portions 40 are not arranged symmetrically with respect to an axis 60 that bisects the central portion 20. Rather, one bow portion 40 is rotated by 180° about an axis that is orthogonal to the plane of the wrapping sheet 10 (i.e., an axis that extends into the plane of FIG. 6A) relative to the other bow portion 40. Like the widening of the bow portions 40 described above, the rounding of the end of the bow portions 40 makes the bow "plume" to form a flower-like bow. The widening of the bow portions 40 (shown in FIG. 5) and the rounded edge (shown in FIG. 6A) may be used together in some embodiments to further enhance the "pluming" effect.

Figure 6B:
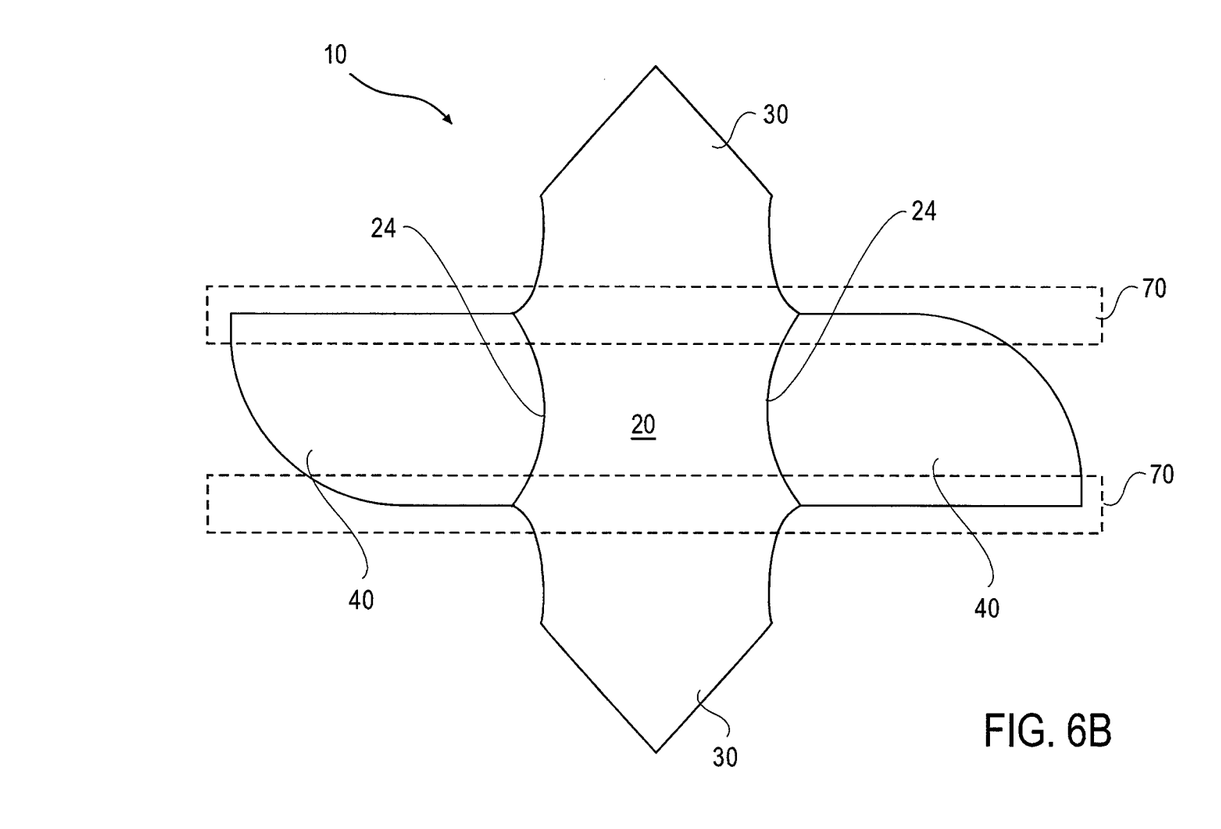

FIG. 6B is another embodiment of the wrapping sheet 10. This embodiment is similar to the embodiment of FIG. 6A in that the flaps 30 are triangularly shaped with two vertices cut out, and the two bow portions 40 are positioned such that one is a 180° rotation of the other with respect to an axis extending into the page of the figure. The embodiment of FIG. 6B, however, differs from that of FIG. 6A in that the interface between the bow portions 40 and the central portion 20 (e.g., seams 24) are rounded or curved. Preferably, the seams 24 curve such that the area of the central portion 20 is reduced. When the wrapping sheet of FIG. 6A, which has straight seams between the bow portions 40 and the central portion 20, is used to wrap a box, the parts of the fabric that go around the edges of the box (e.g., edge regions 70) pull together tighter than the middle part of the fabric that just covers the top of the box (e.g., region between the edge regions 70). This tension difference among the different parts of the fabric sometimes results in a "bulge" forming in the middle part of the central portion 20 due to the presence of extra fabric, making it difficult to produce an end product that looks "neat." By arching the seam 24, the extra fabric in the middle of the center portion 20 can be pulled more tightly when the bow portions 40 are tied together. Hence, the arched seam 24 facilitates the gift-wrapping process by making it easier to produce a neater—and therefore a more aesthetically pleasing—end product.

The wrapping sheet 10 may be made of any flexible, soft material including but not limited to cotton, polyester, silk, rayon, nylon, organza, chiffon. The bow portions 40 may be made of the same material or different material from the rest of the wrapping sheet 10. If the bow portions 40 are made of a material that is different from the rest of the wrapping sheet 10, the bow portions would be sewn, glued, or otherwise attached to and integrated with the central portion 20. In some embodiments, a single piece of material is used for the entire wrapping sheet 10 (i.e., the bow portions 40 have the same pattern as the rest of the wrapping sheet 10).

Optionally, a flat piece of a semi-rigid material (e.g., cardboard) may be integrated into the wrapping sheet 10 to form a base for a gift. The semi-rigid material would facilitate the gift-wrapping process where the object to be wrapped is of an irregular shape, by functioning as a box. Even where there is no semi-rigid material that is integrated with the wrapping sheet 10, a user can place a piece of cardboard in the wrapping sheet 10 during the wrapping process.

Although it is contemplated that fastening means may be used in conjunction with the knots, the knots, in most cases, securely wrap the gift object. Small hooks or Velcro, for example, may be placed on the flaps 30 to either eliminate the need to tie the flaps 30 together, or to provide additional security. Similarly, hooks or Velcro may be strategically placed on the bow portions 40.

Embodiments of the present invention may provide various advantages not provided by conventional wrapping paper. First, the wrapping sheet 10 is convenient to use. All the wrapping material is in one single integrated piece, without the need for bows, ribbons, scissors, and tape or other extra parts to keep track of. Since the bow portions 40 are attached to the rest of the wrapping sheet and are already chosen to match in color and pattern, the gift wrapper is relieved of the burden of selecting and stocking multiple tools and materials. Also, the wrapping sheet 10 is easy to use because all one has to do is tie the flaps 30 together and then the bow portions 40. The flaps 30 do not have to look pretty when tied because they will be covered by the bow portions 40. The bow portions 40 are preferably made of a material that is forgiving so that the end product will look nice even if the bow is not perfect. Since the flexible material wraps around edges of the object to be wrapped without getting fold lines or wrinkles, one does not have to be especially skilled to produce an attractive end product. Hence, this flexible material should be an attractive wrapping choice for kids or those who are not good with wrapping. Due to the absence of folding lines and the unique shape, the wrapping sheet 10 can be used for a gift of a wide size and shape range.

Second, the wrapping sheet 10 reduces waste. The wrapping sheet 10 may be reused as many times as desired, and even washed if needed.

Third, the wrapping sheet 10 is environmentally friendly, as it does not tap into natural resources the way paper-based wrapping material does.

While there may be other wrapping methods that address one or more problems of the conventional wrapping-paper-based gift-wrapping method, they are usually lacking in convenience compared to the wrapping sheet 10 of the invention. For example, the traditional Japanese gift-wrapping method that is known as furoshiki uses a flexible fabric. However, the fabric that is used in furoshiki is square, and it requires a higher skill level to make the end product attractive. Furthermore, folding and tying furoshiki in the way it is designed to be used does not result in formation of a bow, which is commonly a part of the look that completes a modern-day gift.

U.S. Pat. No. 5,004,144 discloses a reusable gift wrapping method using a fabric. However, the fabric uses male and female Velcro pads that have to be mated to achieve wrapping, which means a certain fabric can only be used for a gift of a narrow size range. Thus, one would still need to deal with the hassle of making sure s/he has the right-sized wrapping material for the gift that needs to be wrapped. Furthermore, this patent discloses a bow portion that is physically separate from the rest of the fabric, which means the bow portion could get lost. One would still have multiple parts to keep track of using the wrapping method of U.S. Pat. No. 5,004,144.

While the invention has been described in terms of particular embodiments and illustrative figures, those of ordinary skill in the art will recognize that the invention is not limited to the embodiments or figures described.

The description is not intended to be exhaustive or to limit the invention to the precise form disclosed. It should be understood that the invention can be practiced with modification and alteration and that the invention be limited only by the claims and the equivalents thereof.

What is claimed is:

1. A flexible sheet for wrapping an object, comprising:
a center portion having a first side, a second side, a third side, and a fourth side, the first side being parallel to the third side and the second side being parallel to the fourth side;
flaps connected to the first side and the third side, each of the flaps being configured to cover the object and be joined to each other; and
bow portions comprising fabric pieces attached to the second side and the fourth side, wherein the bow portions are configured to cover a part of the flaps and form a decorative bow when tied together;
wherein the bow portions are made of a different material than the center portion and the flaps.

2. The sheet of claim 1, wherein the sheet is a fabric.

3. The sheet of claim 1, wherein the bow portions have a different shape than the flaps.

4. The sheet of claim 1, wherein each of the flaps has a triangularly-shaped portion.

5. The sheet of claim 1, wherein outer ends of the bow portions are wider than inner ends that meet the center portion.

6. The sheet of claim 1, wherein the outer ends of the bow portions are rounded.

7. The sheet of claim 1, wherein each of the bow portions has a quarter-circle shape.

8. The sheet of claim 7, wherein the bow portions comprise a first bow portion and a second bow portion, wherein the first bow portion is positioned such that if it were rotated by 180° about an axis that is orthogonal to the plane of the sheet, it would match the second bow portion.

9. The sheet of claim 7 further comprising fastening means formed on at least one of the flaps and the bow portions.

10. The sheet of claim 9, wherein the fastening means comprises hooks.

11. The sheet of claim 9, wherein the fastening means comprises Velcro pads.

12. The sheet of claim 9 further comprising a flat, rigid material attached to the central portion.

13. The sheet of claim 9, wherein the central portion, the flaps, and the bow portions are part of a single piece of flexible material.

14. The sheet of claim 1, wherein the flaps are sewn to the first side and the third side and the bow portions are sewn to the second side and the fourth side.

15. The sheet of claim 1, wherein an interface between at least one of the bow portions and the central portion is an arch.

16. The sheet of claim 15, wherein the arch curves to reduce the area of the central portion.

17. The sheet of claim 1, wherein the bow portions are configured to form a decorative bow when tied together using a knot.

* * * * *